United States Patent [19]

Zoiss et al.

[11] Patent Number: 5,768,369
[45] Date of Patent: Jun. 16, 1998

[54] TELEPHONE TEST SET KEYPAD WITH INTEGRATED DYNAMIC MICROPHONE

[75] Inventors: Edward J. Zoiss, Moorpark, Calif.; Joseph E. Gleason, Eagan, Minn.; Kurt Foulger, Newbury Park, Calif.

[73] Assignee: Harris Corporation, Melbourne, Fla.

[21] Appl. No.: 754,077

[22] Filed: Nov. 20, 1996

[51] Int. Cl.⁶ ........................................... H04M 1/00
[52] U.S. Cl. .................. 379/433; 379/434; 379/429; 379/368; 379/369; 379/370
[58] Field of Search .................. 379/433, 434, 379/428, 429, 368, 369, 370; 455/90, 575

[56] References Cited

U.S. PATENT DOCUMENTS 3,627,930  12/1971  Tolman ............................. 379/433

*Primary Examiner*—Jack Chiang
*Attorney, Agent, or Firm*—Charles E. Wands

[57] ABSTRACT

Unwanted acoustic noise and environmental degradation associated with the use of a highly sensitive microphone in a telephone test set are eliminated by a microphone-integrated keypad laminate architecture, in which a microphone is snugly captured within a microphone holder molded into a pliable keypad unit and its leads sealed against the environment and case vibration. The keypad unit is supported by a keypad support structure adjacent to the test set's keypad face, so that the microphone holder is retained adjacent to an acoustic coupling port, and the keypad's keys are accessible by way of keypad apertures in the keypad face. A printed circuit board urges the keypad unit into engagement with the keypad support structure. The keypad unit and the printed circuit board have sealed aperture arrangements through which electrical leads of the microphone pass for connection to the circuit board.

15 Claims, 4 Drawing Sheets

TELEPHONE TEST SET KEYPAD WITH INTEGRATED DYNAMIC MICROPHONE

CROSS-REFERENCE TO RELATED APPLICATIONS

The present application relates to subject matter disclosed in coincidentally filed U.S. patent applications: Ser. No. 08/754,076, filed on Nov. 20, 1996, entitled "Variable Geometry Battery Compartment for Accommodating Different Sized Batteries in Telephone Craftsperson's Test Set," by E. Zoiss et al; Ser. No. 08/754,075, filed on Nov. 20, 1996, entitled "Line Cord Strain Relief Attachment for Telephone Test Set," by E. Zoiss et al; and Ser. No. 08/753, 101, filed on Nov. 20, 1996, entitled "Telephone Test Set LCD panel Carrier," by E. Zoiss et al; and U.S. Design patent application Ser. No. 29/061,617, filed on Oct. 28, 1996, entitled: "ISDN Test Set," by Roy Soto et al, which is a continuation-in-part of U.S. Design patent application Ser. No. 29/053,246, entitled: "ISDN Test Set," by Roy Soto et al, filed Apr. 18, 1996, each the above applications being assigned to the assignee of the present application and the disclosures of which are herein incorporated.

FIELD OF THE INVENTION

The present invention relates in general to portable communication devices, such as telephone craftsperson's test sets, and is particularly directed to a new and improved telephone test set keypad laminate configuration, in which a microphone is snugly captured within a microphone holder molded into a pliable keypad unit, so that the microphone may be acoustically shielded from ambient vibration that may be imparted to the test set housing. In addition, the laminate keypad architecture of the invention provides a protective seal across the material boundary of the keypad between a molded microphone pocket of the test set case in which the microphone is captured and an interior printed circuit board to which the leads of the microphone are electrically connected.

BACKGROUND OF THE INVENTION

A variety of audio/speech utility devices, such as telephones, headsets, and the like, employ microphones. Because microphones are extremely sensitive components, they are sensitive to a variety of acoustic stimuli other than speech. In addition, it is important that they be shielded from potentially damaging effects of moisture and foreign matter. While these sensitivity characteristics are generally not a problem in a relatively sheltered environment, such as an office building or home, they can create a significant impediment in field equipment, such as a telephone craftsperson's test set, that is customarily exposed to a harsh environment. Indeed, it has been found that such highly sensitive components will readily pick up a variety of extraneous acoustic stimuli, such as rubbing or grating a telephone set against the user's face or hand.

SUMMARY OF THE INVENTION

In accordance with the present invention, the above-described unwanted acoustic input and environmental exposure problems associated with the use of a highly sensitive microphone for field operational equipment, such as a craftsperson's telephone test set, are effectively eliminated by a microphone-integrated keypad laminate architecture. Pursuant to the invention, a microphone is snugly captured within a microphone holder that is molded into a pliable keypad unit, so that the microphone may be acoustically shielded from ambient vibration imparted to the test set housing. In addition, the laminate keypad architecture of the invention provides a protective seal across the material boundary of the keypad between a molded microphone pocket of the test set case in which the microphone is captured and an interior printed circuit board to which the leads of the microphone are electrically connected.

To this end, a test set in which the microphone integrated keypad architecture of the present invention may be installed has a plurality of apertures associated with respective buttons of a keypad face of the test set. These apertures are arranged and sized to receive respective buttons of a pliable keypad unit, when the keypad unit is placed against a multiple well or pocket-configured matrix structure that is molded as part of the interior molded surface of the test set case. This molded matrix structure has a top surface that is generally planar—conforming with a generally planar, front surface of the keypad unit.

In order to provide a secure, self-sealing engagement between the front surface of the keypad unit and the molded interior matrix structure of the test set's body, the top surface of the matrix preferably contains a continuous crush rib structure. When the front surface of the keypad unit is pressed against the molded matrix structure, the crush rib structure of the matrix digs into the pliable front surface of the keypad unit, to provide a tight seal between the keypad unit and the test set case.

In addition to accommodating the buttons of the keypad unit, the test set case's molded, multi pocket-configured interior matrix structure also includes a microphone pocket which is aligned with an acoustic-coupling microphone grille in the keypad face of the test set case. The microphone pocket is configured to accommodate an associated microphone holder molded into the keypad unit. The microphone holder of the keypad unit is sized to snugly receive a microphone, which has a pair of conductive leads projecting therefrom.

To insulate the microphone leads acoustically and electrically, as well as provide a waterproof seal therefor, the microphone's leads are inserted through a pair of rubber nipples. These rubber nipples are captured within respective holes in the keypad unit, when a microphone installed in the keypad's microphone holder is placed within the confines of the matrix structure's microphone pocket adjacent to the test set microphone grille. In this installation, the microphone's leads project beyond the protective nipples, so that the microphone leads may be connected to the audio signal processing circuitry of a printed circuit board pressed against the back surface of the keypad unit.

The back surface of the keypad unit further includes a distribution of alignment projections which serve to facilitate alignment of the printed circuit board with the keypad unit in the course of assembly of the test set. The printed circuit board has a pair of corresponding bores through which the ends of the nipple-protected microphone leads project in the assembled configuration of the keypad unit/test set case architecture.

To securely attach the printed circuit board to the interior molded surface of the test set case, so that the printed circuit board presses against the back surface of the keypad unit, the test set case includes a set of column-configured printed circuit board-mounting bosses having bores sized to receive screws that pass through corresponding holes in the printed circuit board and the keypad unit, for securing the printed circuit board, the keypad unit and the test set case in a stacked or laminate structure.

The keypad architecture of the invention is assembled by placing the keypad unit atop the printed circuit board, such that the nipple-sealed leads of the microphone project through the holes in the printed circuit board, allowing the microphone leads may to be connected to the audio signal processing circuitry mounted on the printed circuit board. This combined structure is then inverted and placed into the test set case.

Screws are then inserted through mounting holes in the printed circuit board and keypad unit and tightened into bores of the bosses of the test set case, so that the printed circuit board is urged against the back surface of the keypad unit. This, in turn, urges the front surface of the keypad unit against the crush ribs of the molded matrix structure, which digs into the flat front surface of the keypad unit, thereby providing a tight sealing fit between the keypad unit and the test set case.

This sealing of the front surface of the keypad unit against the crush rib structure of the pocket matrix structure, causes a microphone captured within the microphone holder to be acoustically shielded from ambient vibration that may be imparted to the test set housing. In addition, the protective nipple arrangement for the microphone leads provides a protective seal across the material boundary of the keypad unit between the molded microphone pocket of the test set case and the printed circuit board.

DETAILED DESCRIPTION

Figure 1:
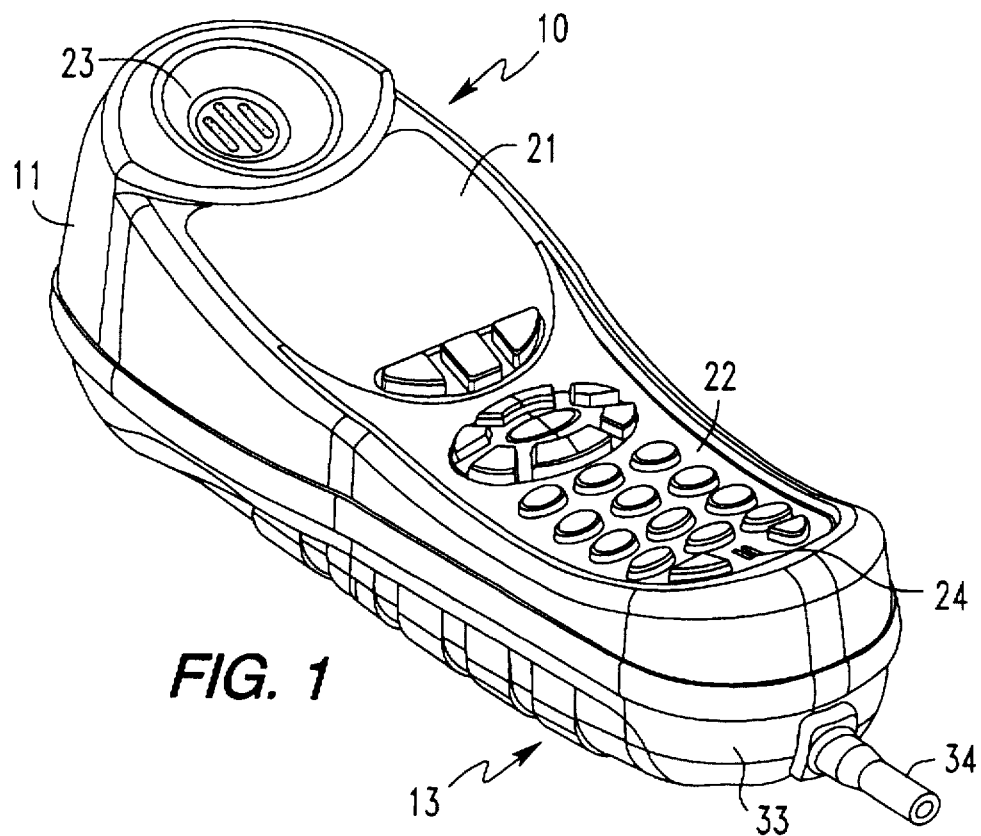
FIG. 1 is a perspective view showing the keypad face side of a telephone craftsperson's test set described and illustrated in the above-referenced applications.
Figure 2:
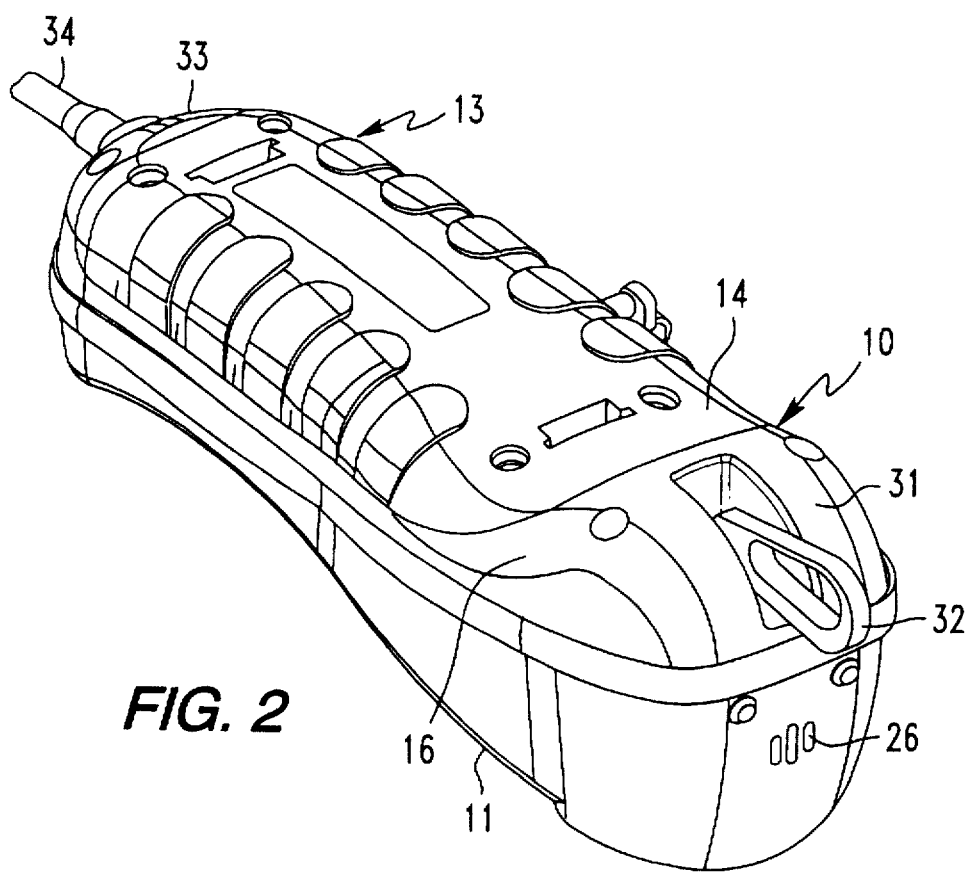
FIG. 2 is a perspective view showing the rear, battery cover side portion of the test set of FIG. 1.

FIGS. 1 and 2 are pictorial perspective illustrations of a telephone craftsperson's test set 10 generally configured as described and illustrated in the above-referenced applications. The test set's body or shell material is preferably a rugged plastic of the type used in the industry. As shown in FIG. 1, a front housing section or case 11 of the test set has a front face 21 containing a keypad region 22, a receiver grille 23, a microphone grille 24, and a speaker grille 26. FIG. 2 shows a multi-segment rear housing section 13 of the test set, having a battery cover or door 14, which engages and is conformal with the periphery of a battery compartment of a base housing section or case 16. Case 16 has a first or top end 31, to which a craftsperson's belt clip 32 is attached, and a second or bottom end 33 having a communication cord access port 34.

Figure 3:
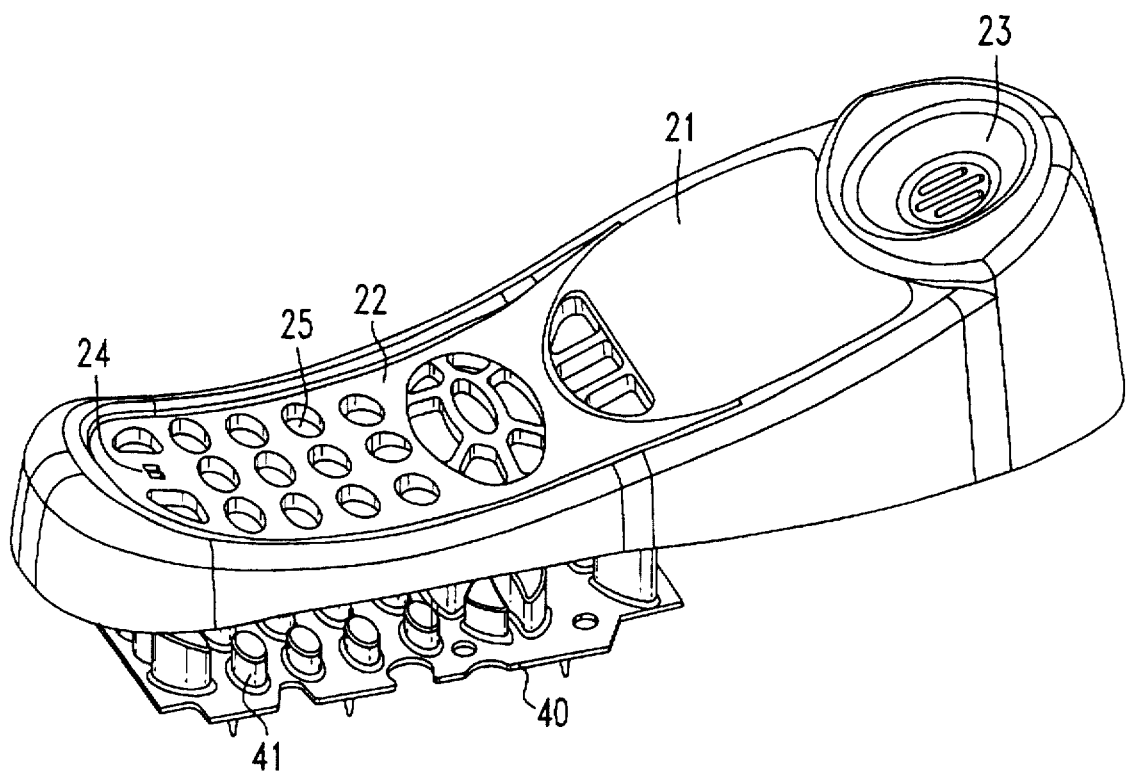
FIG. 3 is a diagrammatic perspective view of the test set case of the test set of FIGS. 1 and 2, showing apertures through the keypad face aligned with an associated keypad unit.
Figure 4:
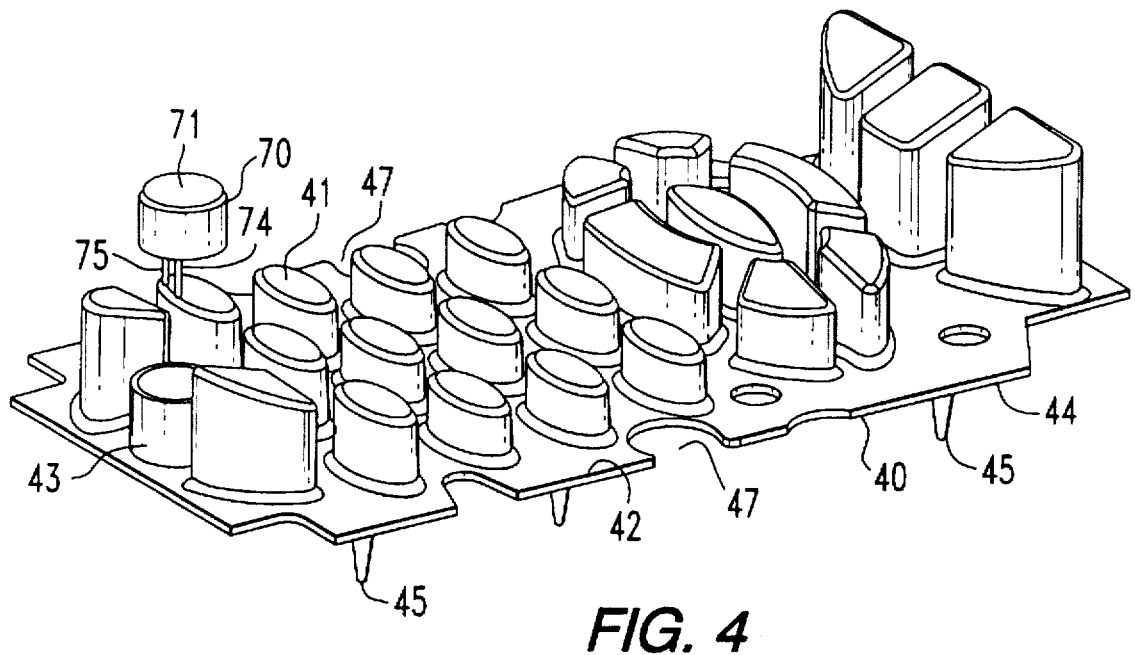
FIGS. 4 and 5 are respective obverse and reverse perspective views of a keypad unit.
Figure 5:
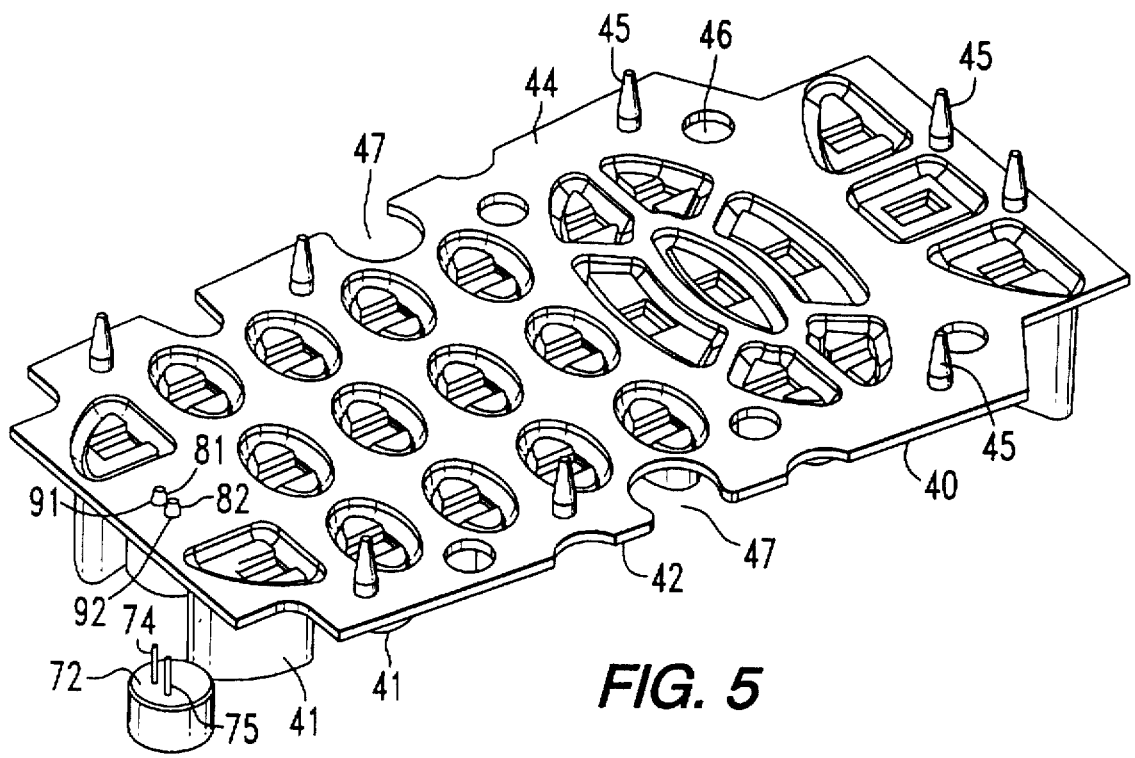
Figure 6:
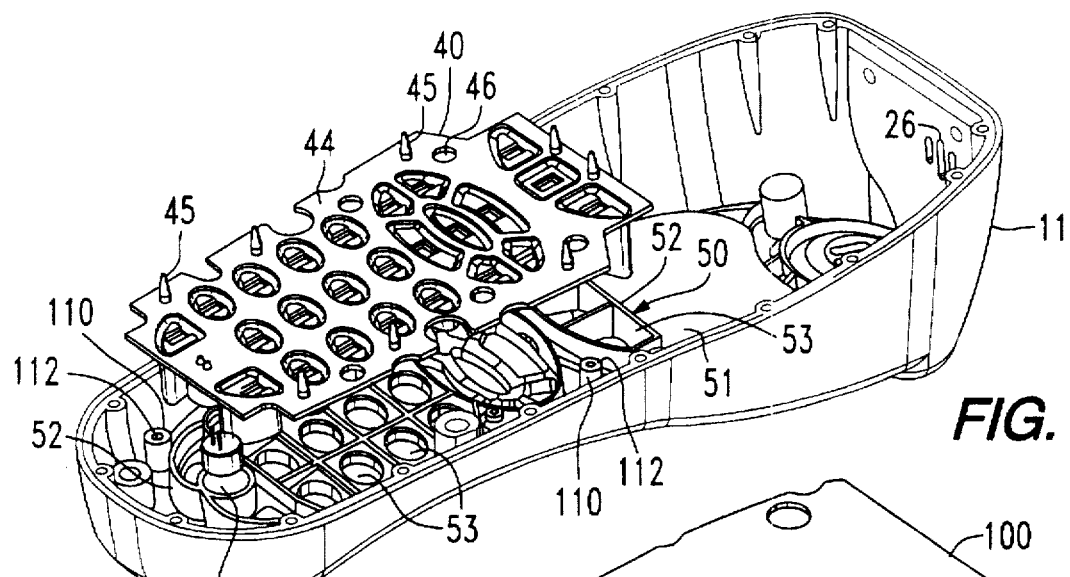
FIGS. 6–8 are perspective views showing the assembly of the telephone test set keypad laminate configuration of the invention.

As shown in the diagrammatic perspective view of FIG. 3, the keypad region 22 of front face 21 of the test set case 11 has a plurality of apertures 25. These apertures are arranged in association with and are sized to receive respective buttons 41 of a pliable (e.g., rubber) keypad unit 40, obverse and reverse perspective views of which are shown in FIGS. 4 and 5, respectively, as the keypad unit 40 is placed against a multiple well or pocket-configured matrix structure 50 molded as part of the interior molded surface 51 of the test set case 11, as illustrated in FIG. 6. The top surface portions 52 of each of the individual wells or pockets 53 of the test set case's molded matrix structure 50 are generally coplanar with one another, thereby substantially coinciding with the generally planar, front surface 42 of the keypad unit 40, when the keypad unit 40 is placed against the molded matrix structure 50.

In order to provide a secure, self-sealing engagement between the front surface 42 of the keypad unit 40 and the matrix structure 50, the top surface portions 52 preferably contains a continuous crush rib structure, configured, for example, as a distribution of triangular projections. When the front surface 42 of the keypad unit 40 is pressed against the molded matrix structure 50, the crush ribs of the top surface portions 52 of the pocket matrix 50 'dig' into or firmly 'grab' the pliable front surface 42 of the keypad unit 40, thereby providing a tight sealing fit between the keypad unit 40 and the test set case 11.

In addition to accommodating the buttons 41 of the keypad unit 40, the test set case's molded, multi well-configured interior matrix structure 50 is also configured to include a generally cylindrically shaped well or microphone pocket 54, which is aligned with the microphone grille 24 in the front face 21 of the test set case 11. Pocket 54 is sized and shaped to accommodate the outer diameter of an associated cylindrically configured microphone holder 43 that is molded into the keypad unit 40. The microphone holder 43 of the keypad unit is sized to snugly receive a reduced size microphone 70 of the type commonly employed in audio/speech utility devices, such as telephones, headsets, and the like.

As shown in FIGS. 4 and 5, microphone 70 is configured as a generally cylindrically shaped component, having a front, acoustic interface surface 71 and a rear surface 72, from which a pair of conductive leads 74 and 75 project. In order to insulate leads 74 and 75 both acoustically and electrically, as well as provide a waterproof seal therefor, leads 74 and 75 are surrounded by a pair of rubber nipples 81 and 82 having respective bores through which the leads 74 and 75 pass. Rubber nipples 81 and 82 are configured so as to be captured within respective holes 91 and 92 in the keypad unit 40, when a microphone 70 that has been installed in the keypad's microphone holder 43 is placed within the confines of the microphone pocket 54, so that it is adjacent to the test set microphone grille 24.

When so captured, the leads 74 and 75 of microphone project past the ends of the nipples, so that the microphone leads may be connected to the audio signal processing circuitry of a printed circuit board 100, as the printed circuit board 100 is pressed against the back surface 44 of the keypad unit 40. Keypad unit 40 also includes a further plurality of nipple-configured assembly alignment projections 45 distributed on its back surface 44, which serve to facilitate alignment of the printed circuit board 100 with the keypad unit in the course of assembly of the test set.

Figure 7:
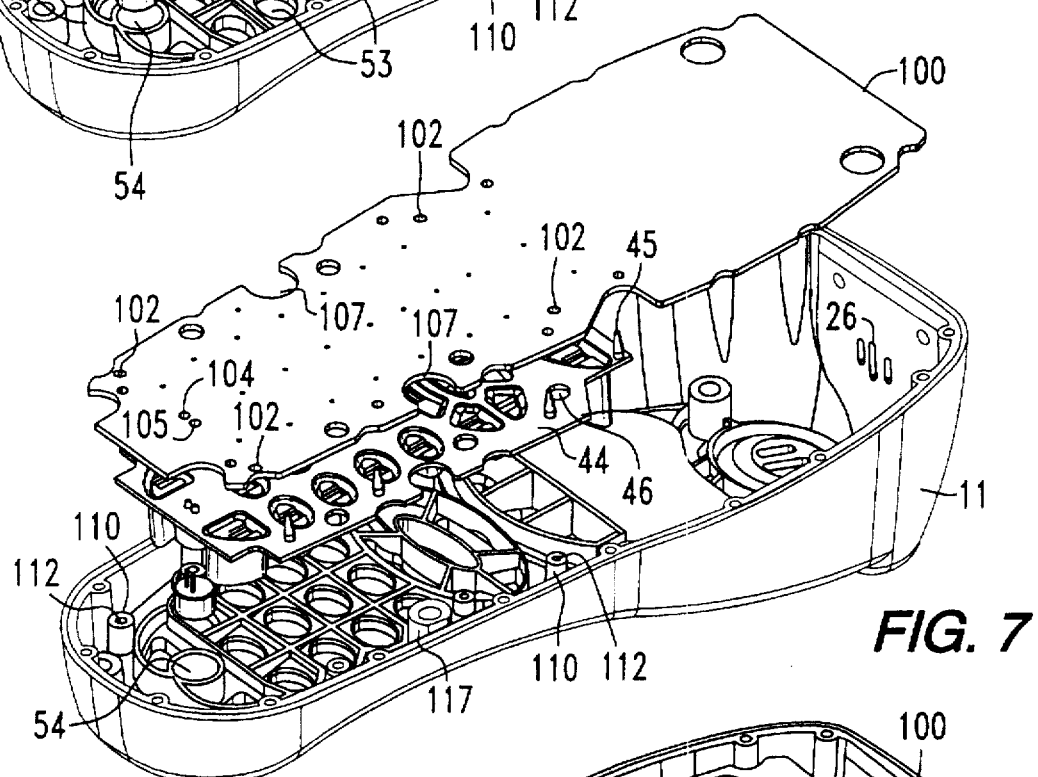
Figure 8:
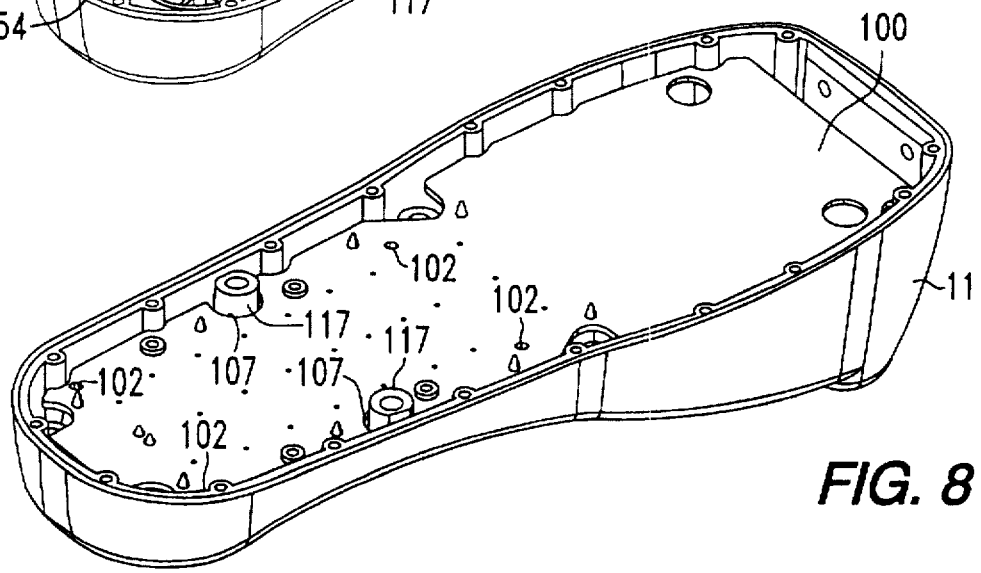

As shown in FIGS. 7 and 8, to accommodate the nipple-protected leads 74 and 75, printed circuit board 100 has a pair of corresponding bores 104 and 105, through which the ends of leads 74 and 75 and the nipples 81 and 82 respectively project in the assembled configuration of the keypad unit/test set case architecture. In order to securely attach the printed circuit board 100 to the interior molded surface 51 of the test set case 11, so that the printed circuit board may press against the back surface 44 of the keypad unit 40, test set case 11 includes a set of column-configured printed circuit board-mounting bosses 110. Bosses 110 include respective bores 112 which are sized to receive screws (not shown) that pass through corresponding holes 102 in the printed circuit board 100 and holes 46 in the generally flat front surface 42 of the keypad unit 40, for securing the printed circuit board 100, keypad unit 40 and test set case 11 in a laminate structure as described below. The interior molded structure of the test set case 11 includes additional bosses that are used to mount additional case components, not shown. To accommodate these additional bosses 117, printed circuit board 100 includes further apertures 107, and keypad unit 40 includes additional apertures 47.

Assembly of the laminate keypad structure is carried out by placing the keypad unit 40 atop the printed circuit board 100, such that the nipple-sealed leads 74 and 75 of the microphone 70 project through the holes 104 and 105 in the printed circuit board, allowing the microphone leads to be connected to the audio signal processing circuitry mounted on the printed circuit board. This combined structure is then inverted and placed into the test set case's molded, multi well-configured interior matrix structure 50 as a stacked or laminate arrangement, as shown in FIGS. 6 and 7.

Screws are then inserted through the printed circuit board 100 and keypad unit 40 and into the bores 112 of the bosses 110 of the test set case 11, and tightened against the printed circuit board 100, so as to cause the printed circuit board 110 to be pressed against the back surface 44 of the keypad unit 40. This, in turn, urges the front surface 42 of the keypad unit 40 against the crush ribs of the top surface portions 52 of the pockets of the molded matrix structure 50. As described above, the crush ribs of the top surface portions 52 of the pocket matrix structure 50 dig into the flat front surface 42 of the keypad unit 40, thereby providing a tight sealing fit between the front surface 42 of the keypad unit 40 and the test set case 11, as the printed circuit board is secured to the bosses 110 of the test set case 11, as shown in FIG. 8.

With the front surface 42 of the keypad unit 40 being sealed against the crush ribs of the top surface portions 52 of the pocket matrix structure 50, which not only receives the buttons 41 of the keypad unit 40, but also receives the microphone holder 43, a microphone 70 that has been snugly captured within the microphone holder is acoustically shielded from ambient vibration that may be imparted to the test set housing.

In addition, the incorporation of the protective nipple arrangement for the microphone leads provides a protective seal across the material boundary of the keypad unit 40 between the molded microphone pocket 54 of the test set case (in which the microphone 70 is captured) and the printed circuit board.

As will be appreciated from the foregoing description, unwanted acoustic input and environmental exposure problems associated with the use of a highly sensitive microphone in a craftsperson's telephone test set are effectively eliminated by the microphone-integrated keypad laminate architecture of the present invention, in which the microphone is snugly captured within a microphone holder molded into a pliable keypad unit and its leads are protected both against the environment and vibration. Not only does this structure serve to acoustically shield the microphone picking up from ambient vibration imparted to the test set housing, but it also provides a protective seal through the keypad between the test set case and the printed circuit board to which the leads of the microphone are electrically connected.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A microphone-integrated keypad architecture for a communication device comprising:

a housing having an acoustic coupling port and a keypad mounting structure that is configured to support a microphone adjacent to said acoustic coupling port;

a keypad unit containing a microphone holder into which said microphone is installed, and being configured to engage said keypad mounting structure, so that said microphone holder is received by said keypad mounting structure adjacent to said acoustic coupling port of said housing; and a circuit board urging said keypad unit into engagement with said keypad mounting structure of said housing; and wherein said keypad unit and said circuit board have sealed aperture arrangements through which electrical leads of said microphone pass for electrical connection to circuitry of said circuit board.

2. A microphone-integrated keypad architecture according to claim 1, wherein said sealed aperture arrangements are configured to provide an acoustic barrier around said electrical leads of said microphone.

3. A microphone-integrated keypad architecture according to claim 1, wherein said housing has a plurality of apertures that provide access to respective keys of said keypad unit, when said keypad unit engages said keypad mounting structure.

4. A microphone-integrated keypad architecture according to claim 1, wherein said keypad mounting structure comprises a multiple pocket-configured structure molded as part of an interior surface of said housing, said multiple pocket-configured structure having a keypad-engaging surface that generally conforms with a generally planar surface of said keypad unit.

5. A microphone-integrated keypad architecture according to claim 4, wherein said keypad-engaging surface of said multiple pocket-configured structure is configured as a crush rib structure.

6. A microphone-integrated keypad architecture according to claim 4, wherein said multiple pocket-configured structure includes a microphone pocket which adjoins said acoustic coupling port of said housing, and is configured to accommodate said microphone holder of said keypad unit, so that said microphone is supported adjacent to said acoustic coupling port of said housing.

7. A microphone-integrated keypad architecture according to claim 6, wherein said sealed aperture arrangements comprise protective nipples captured within respective holes in said keypad unit, when said microphone is installed in said microphone holder.

8. A microphone-integrated keypad architecture according to claim 7, wherein said protective nipples surrounding said microphone pass through corresponding bores in said circuit board.

9. A microphone-integrated keypad architecture for a telephone test set having an acoustic coupling port and a plurality of adjacent keypad apertures in a keypad face of said telephone test set, a keypad support structure adjacent to said keypad face of said telephone test set, a keypad unit having a microphone holder in which a microphone is installed and a plurality of keys, and being supported by said keypad support structure adjacent to said keypad face, so that said microphone holder is retained in said keypad support structure adjacent to said acoustic coupling port and said keys are accessible by way of said keypad apertures in said keypad face, a circuit board urging said keypad unit into engagement with said keypad support structure, and wherein said keypad unit and said circuit board have sealed aperture arrangements through which electrical leads of said microphone pass for electrical connection to circuitry of said circuit board.

10. A microphone-integrated keypad architecture according to claim 9, wherein said sealed aperture arrangements are configured to provide a sealed acoustic barrier around said electrical leads of said microphone.

11. A microphone-integrated keypad architecture according to claim 10, wherein said keypad support structure comprises a multiple pocket-configured structure molded as part of an interior surface of said test set, said multiple pocket-configured structure having a keypad-engaging surface that generally conforms with a generally planar surface of said keypad unit.

12. A microphone-integrated keypad architecture according to claim 11, wherein said keypad-engaging surface of said multiple pocket-configured structure has a crush rib configuration.

13. A microphone-integrated keypad architecture according to claim 12, wherein said multiple pocket-configured structure includes a microphone pocket which adjoins said acoustic coupling port of said housing, and is configured to accommodate said microphone holder of said keypad unit, so that said microphone is supported adjacent to said acoustic coupling port of said keyface of said test set.

14. A microphone-integrated keypad architecture according to claim 10, wherein said sealed aperture arrangements comprise protective nipples captured within respective holes in said keypad unit, when said microphone is installed in said microphone holder.

15. A microphone-integrated keypad architecture according to claim 14, wherein said protective nipples surrounding said microphone pass through corresponding bores in said circuit board.

* * * * *